United States Patent
Iwasaki et al.

(10) Patent No.: US 11,736,219 B2
(45) Date of Patent: Aug. 22, 2023

(54) COMMUNICATION CONTROL DEVICE AND COMMUNICATION CONTROL SYSTEM

(71) Applicants: Kabushiki Kaisha Toshiba, Tokyo (JP); Toshiba Infrastructure Systems & Solutions Corporation, Kawasaki (JP)

(72) Inventors: Kengo Iwasaki, Meguro (JP); Hiroki Fukuoka, Yokohama (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 163 days.

(21) Appl. No.: 17/355,484

(22) Filed: Jun. 23, 2021

(65) Prior Publication Data

US 2021/0320744 A1    Oct. 14, 2021

Related U.S. Application Data

(63) Continuation of application No. PCT/JP2019/044310, filed on Nov. 12, 2019.

(30) Foreign Application Priority Data

Dec. 28, 2018   (JP) ................... 2018-247195

(51) Int. Cl.
*H04K 3/00* (2006.01)
*H04L 9/32* (2006.01)

(52) U.S. Cl.
CPC ............. *H04K 3/42* (2013.01); *H04L 9/3268* (2013.01); *H04L 9/3273* (2013.01)

(58) Field of Classification Search
CPC ............ H04K 3/42; H04K 3/825; H04K 3/86; H04K 3/43; H04K 2203/18;
(Continued)

(56) References Cited

U.S. PATENT DOCUMENTS 6,480,963 B1    11/2002  Tachibana et al.
7,826,839 B1 *  11/2010  Nicholas .................. H04K 3/28
                                                         455/12.1
(Continued)

FOREIGN PATENT DOCUMENTS

EP    3139564 A1 *  3/2017  ............... H04K 1/00
JP    2000-4225 A      1/2000
(Continued)

OTHER PUBLICATIONS

International Search Report dated Feb. 4, 2020 in PCT/JP2019/044310, filed on Nov. 12, 2019, 5 pages (with English Translation).
(Continued)

*Primary Examiner* — Kambiz Zand
*Assistant Examiner* — Afaq Ali
(74) *Attorney, Agent, or Firm* — Maier & Maier, PLLC

(57) ABSTRACT

According to an embodiment, a communication control device includes a communication unit and a jamming control unit. The communication unit wirelessly communicates with a first device and uploads information acquired from the first device to a second device via a network. The jamming control unit allows jamming radio waves to be output to interfere with wireless communication between the first device and a device other than the communication control device, the device being to perform wireless communication in a communication band used by the first device.

9 Claims, 9 Drawing Sheets

(58) Field of Classification Search
CPC ........ H04K 2203/34; H04K 3/28; H04K 3/41; H04L 9/3268; H04L 9/3273; H04L 63/0869; H04L 9/0891; H04L 63/0471; H04L 63/0823; G06F 21/445; G06F 21/606; G06F 21/602; G06F 21/75; H04W 12/033; H04W 12/069; H04W 12/122; H04W 12/72

See application file for complete search history.

(56) References Cited

U.S. PATENT DOCUMENTS

| | | | |
|---|---|---|---|
| 9,107,067 B2 * | 8/2015 | Kim | H04K 3/28 |
| 9,264,174 B2 * | 2/2016 | Jang | H04K 3/42 |
| 9,787,424 B2 * | 10/2017 | Filson | H04W 24/00 |
| 10,873,861 B2 * | 12/2020 | Furuichi | H04W 72/56 |
| 2002/0016913 A1 | 2/2002 | Wheeler et al. | |
| 2002/0099663 A1 * | 7/2002 | Yoshino | H04L 63/0807 705/65 |
| 2005/0033957 A1 | 2/2005 | Enokida | |
| 2006/0112272 A1 | 5/2006 | Morioka et al. | |
| 2006/0294367 A1 | 12/2006 | Yoshioka | |
| 2008/0002651 A1 | 1/2008 | Nakano | |
| 2008/0119130 A1 | 5/2008 | Sinha | |
| 2009/0215387 A1 * | 8/2009 | Brennan | H04K 3/45 455/1 |
| 2011/0092151 A1 | 4/2011 | Brisebois et al. | |
| 2011/0092152 A1 | 4/2011 | Lee et al. | |
| 2012/0214402 A1 | 8/2012 | Shany et al. | |
| 2013/0016832 A1 | 1/2013 | Yamashita | |
| 2018/0167369 A1 | 6/2018 | Shapira | |
| 2019/0044641 A1 * | 2/2019 | Trundle | H04K 3/94 |
| 2020/0204549 A1 | 6/2020 | Tomoeda et al. | |

FOREIGN PATENT DOCUMENTS

| | | |
|---|---|---|
| JP | 2001-111549 A | 4/2001 |
| JP | 2004-506380 | 2/2004 |
| JP | 2004-194295 A | 7/2004 |
| JP | 2004-228608 A | 8/2004 |
| JP | 2004-320751 | 11/2004 |
| JP | 2004-350267 | 12/2004 |
| JP | 2005-39790 | 2/2005 |
| JP | 2005-045305 A | 2/2005 |
| JP | 2005-130449 A | 5/2005 |
| JP | 2005-520230 A | 7/2005 |
| JP | 2006-279337 A | 10/2006 |
| JP | 2007-272539 A | 10/2007 |
| JP | 2009-117887 A | 5/2009 |
| JP | 4601706 B2 | 12/2010 |
| JP | 2011-124908 A | 6/2011 |
| JP | 4750750 | 8/2011 |
| JP | 4843903 | 12/2011 |
| JP | 2013-25374 A | 2/2013 |
| WO | WO 03/077071 A2 | 9/2003 |

OTHER PUBLICATIONS

Extended European Search Report dated Dec. 1, 2022, in corresponding European Application No. 19903672.4, 9 pages.

* cited by examiner

COMMUNICATION CONTROL DEVICE AND COMMUNICATION CONTROL SYSTEM

TECHNICAL FIELD

Embodiments of the present invention relate to a communication control device and a communication control system.

BACKGROUND ART

In social infrastructure systems such as monitoring cameras, the control of equipment and data to be handled may need to be protected from an attack of malware or the like. However, it is difficult to frequently replace equipment constituting a social infrastructure system. Thus, there is a problem in that security measures may become insufficient.

Citation List

Patent Literature

[Patent Literature 1]
Japanese Unexamined Patent Application, First Publication No. 2009-117887

SUMMARY OF INVENTION

Technical Problem

The problem to be solved by the present invention is to provide a communication control device and a communication control system capable of improving the security of a social infrastructure system without changing the social infrastructure system.

Solution to Problem

A communication control device of an embodiment includes a communication unit and a jamming control unit. The communication unit wirelessly communicates with a first device and uploads information acquired from the first device to a second device via a network. The jamming control unit allows jamming radio waves to be output to interfere with wireless communication between the first device and a device other than the communication control device, the device being configured to perform wireless communication in a communication band used by the first device.

DESCRIPTION OF EMBODIMENTS

Hereinafter, a communication control device and a communication control system according to embodiments will be described with reference to the drawings.

First Embodiment

Figure 1:
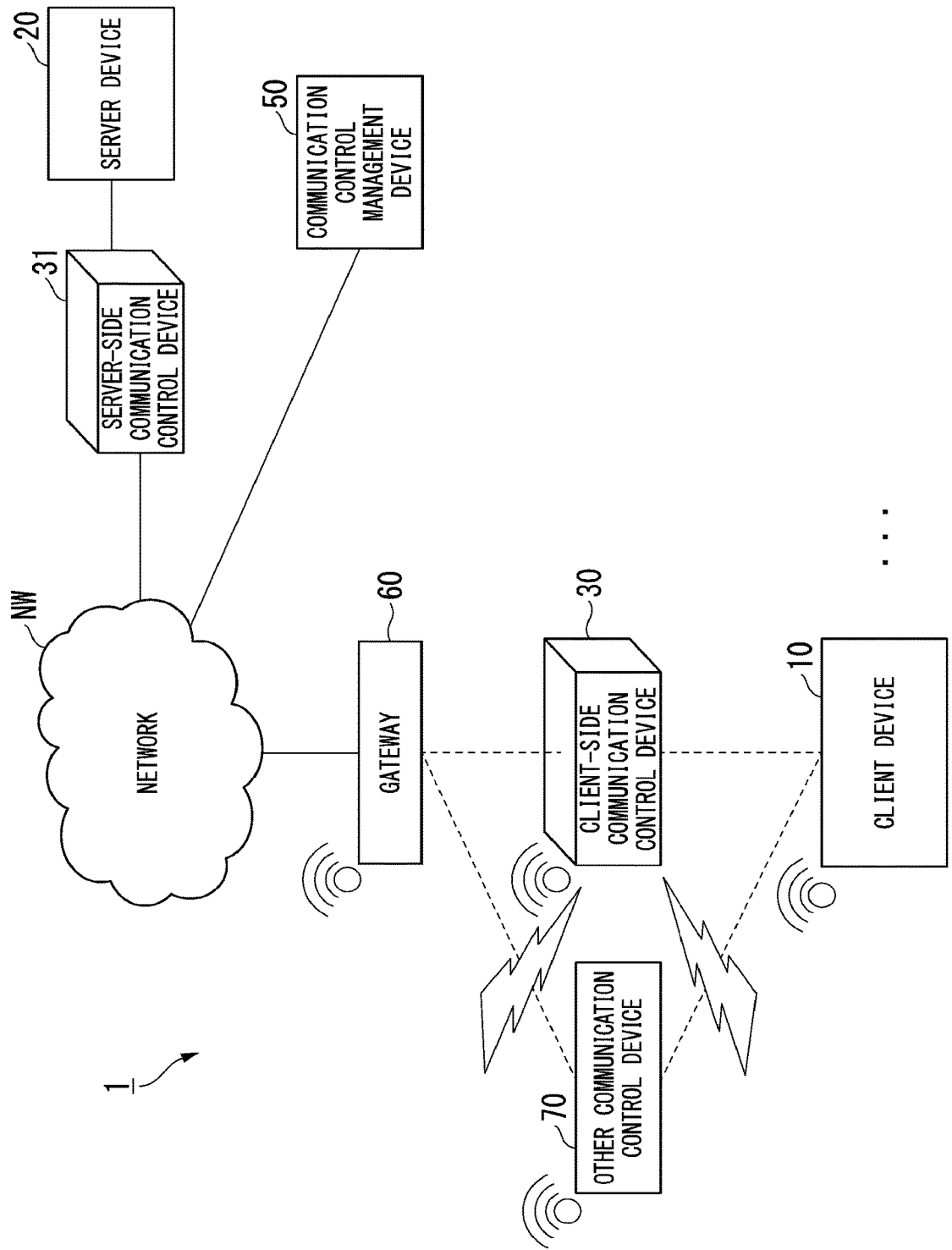
FIG. 1 is a diagram showing an example of a configuration of a communication control system 1 according to an embodiment.

FIG. 1 is a diagram showing an example of a configuration of a communication control system 1 according to an embodiment. The communication control system 1 includes at least one client device 10, a server device 20, at least one client-side communication control device 30, a server-side communication control device 31, a communication control management device 50, and a gateway 60.

The client device 10 and the client-side communication control device 30 communicate with each other through wireless communication.

In the wireless communication, for example, a Wi-Fi network, Bluetooth (registered trademark), and the like are included.

The client-side communication control device 30 communicates with the gateway 60 through wireless communication or wired communication. The gateway 60 communicates with the server-side communication control device 31 through wireless communication or wired communication via a network NW. The server-side communication control device 31 communicates with the client-side communication control device 30 through wired communication via the network NW. The server-side communication control device 31 and the server device 20 perform wired communication.

The client device 10 is connected to the network NW via the client-side communication control device 30. The server device 20 is connected to the network NW via the server-side communication control device 31. Details of the configurations of the client device 10 and the server device 20 will be described below.

The client-side communication control device 30 is connected to the client device 10 and the gateway 60 and mediates communication between the client device 10 and the server device 20. That is, the client-side communication control device 30 functions as a wireless access point of the client device 10. The client-side communication control device 30 receives data acquired by the client device 10 from the client device 10 and transmits the received data to the server device 20. Here, when data is transmitted to the server device 20, the client-side communication control device 30 encrypts data acquired from the client device 10 and transmits the encrypted data to the server device 20.

Also, the client-side communication control device 30 receives data transmitted from the server device 20 to the client device 10 from the server-side communication control device 31 and transmits the received data to the client device 10. Here, the data received by the client-side communication control device 30 is, for example, data encrypted by the server-side communication control device 31. When the data is transmitted to the client device 10, the client-side communication control device 30 decrypts the data received from the server device 20 via the server-side communication control device 31 and transmits the decrypted data to the client device 10.

The server-side communication control device 31 is connected to the server device 20 and the network NW and mediates communication between the client device 10 and the server device 20. The server-side communication control device 31 receives data transmitted from the server device 20 to the client device 10 from the server device 20 and transmits the received data to the client device 10. Here, when data is transmitted to the client device 10, the server-side communication control device 31 encrypts the data acquired from the server device 20 and transmits the encrypted data to the client device 10.

Also, the server-side communication control device 31 receives the data transmitted from the client device 10 to the server device 20 from the client-side communication control device 30 and transmits the received data to the server device 20. Here, the data received by the server-side communication control device 31 is, for example, data encrypted by the client-side communication control device 30. When the data is transmitted to the server device 20, the server-side communication control device 31 decrypts the data received from the client device 10 via the client-side communication control device 30 and transmits the decrypted data to the server device 20.

In the present embodiment, in the data encryption performed by the client-side communication control device 30 and the server-side communication control device 31, encryption based on, for example, a secure socket layer (SSL)/transport layer security (TLS) protocol, is performed. For example, the client-side communication control device 30 and the server-side communication control device 31 combine the SSL/TLS protocol with an HTTP to encrypt data included in the HTTP and to replace the encrypted data with that of HTTP secure (HTTPS) in which security is improved.

The data encryption performed by the client-side communication control device 30 and the server-side communication control device 31 is not limited to a change of the HTTP data to the HTTPS data. The client-side communication control device 30 and the server-side communication control device 31 may replace the SSL/TLS protocol with a secure communication protocol for improving security by combining the SSL/TLS protocol with various communication protocols. For example, the client-side communication control device 30 and the server-side communication control device 31 may replace a file transfer protocol (FTP) with FTP secure (FTPS).

In the present embodiment, the data encrypted by the client-side communication control device 30 or the server-side communication control device 31 is output to the network NW. In other words, in the present embodiment, data flowing through the network NW is encrypted data. Thus, it is possible to avoid a risk that data transmitted/received through the network NW is maliciously accessed from the outside and the data is intercepted and to improve security. The term "data interception" here means an "act of stealing a glance at data" or an "act of extracting data".

The communication control management device 50 issues a client certificate and a secret key to the client-side communication control device 30. For example, the communication control management device 50 issues an IC card storing the client certificate and the secret key. The communication control management device 50 transmits the client certificate and the secret key to be stored in the IC card to the client-side communication control device 30 to which the IC card is attached via the network NW.

The communication control management device 50 issues the server certificate and the secret key to the server-side communication control device 31. For example, the communication control management device 50 issues an IC card storing the server certificate and the secret key. The communication control management device 50 transmits the server certificate and the secret key to be stored in the IC card to the server-side communication control device 31 to which the IC card is attached via the network NW. Each of the client certificate, the server certificate, and the secret key is information required to determine a common key (a session key) used when the client-side communication control device 30 and the server-side communication control device 31 perform encrypted communication.

Also, the communication control management device 50 registers a pair of the client device 10 and the client-side communication control device 30 which are valid. For example, the communication control management device 50 acquires address information of the client device 10 and address information of the client-side communication control device 30, creates a whitelist in which the address information of both of the client device 10 and the client-side communication control device 30 is associated, and stores the whitelist in a storage unit of the own device. For example, the address information includes an IP address and a MAC address. On the basis of the created whitelist, the communication control management device 50 instructs the client-side communication control device 30 to connect to the client device 10 of the address information registered in the whitelist.

The communication control management device 50 may acquire the address information input by a management unit using an operation interface of the own device or may acquire the address information from the client-side communication control device 30. In the latter case, the client-side communication control device 30 may transmit the address information of the client device 10 that has been acquired when short-range wireless communication is established with the client device 10 at the time of initial setting and its own address information to the communication control management device 50 via the network NW.

Here, an example of an environment in which the communication control system 1 is installed will be described. The client device 10 and the server device 20 are components that constitute a social infrastructure system. For example, the social infrastructure is a facility necessary for providing a social base such as a road traffic network, a power generation facility, a power distribution facility, a water treatment facility, or a gas distribution facility. The social infrastructure system is, for example, a mechanism for stably operating the social infrastructure by monitoring the social infrastructure, ascertaining a change in the situation, and coping with the change. In the following, an example in which the client device 10 and the server device 20 are components of a monitoring system that monitors roads and public facilities will be described. In this case, the client device 10 is a device that transmits imaging data obtained by imaging a road condition or the like via the network NW (a network monitoring camera). The server device 20 is a device that receives the imaging data transmitted by the client device 10 via the network NW.

The client device 10 and the server device 20 are not limited to the components of the monitoring system. For example, the client device 10 and the server device may be components of a system that monitors a power situation in the power generation facility or the power distribution facility or components of a system that acquires a distribution situation in a logistics center, a system that acquires an operation situation of a facility in a factory or research institution, or the like.

Here, an example when another communication control device 70 appears as a communication partner of the client device 10 will be described. For example, by changing the settings of the client device 10, or by performing wireless communication using radio waves having a higher radio wave intensity than those of the client-side communication control device 30, the communication partner may be changed from the client-side communication control device 30 to the other communication control device 70. Alternatively, it may be assumed that the client device 10 is connected to the other communication control device 70 through wireless communication in parallel with the client-side communication control device 30. In this case, the other communication control device 70 serves as the wireless access point of the client device 10 and a secure communication environment is not ensured. The client-side communication control device 30 according to the embodiment interferes with the communication between the other communication control device 70 and the client device 10 by outputting jamming radio waves or the like. Also, the client-side communication control device 30 may interfere with communication between the other communication control device 70 and the client device 10 by restricting wireless communication between the client device 10 and a device other than the own device. Details thereof will be given below. Thereby, the communication partner of the client device 10 can be limited to the client-side communication control device 30 and a secure communication environment with improved security can be ensured.

Figure 2:
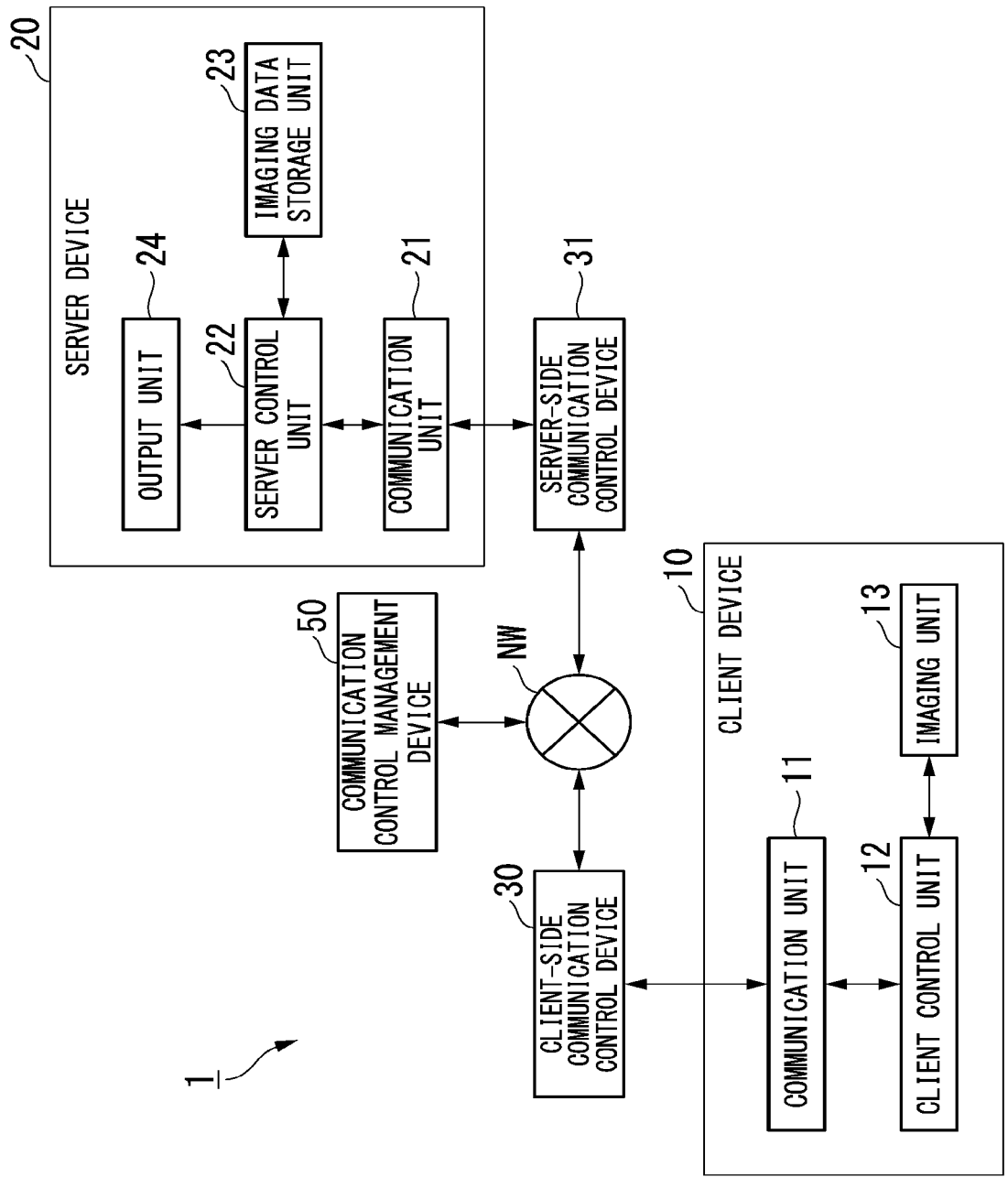
FIG. 2 is a block diagram showing an example of functional configurations of a client device 10 and a server device 20 according to the embodiment.

Next, configurations of the client device 10 and the server device 20 will be described. FIG. 2 is a block diagram showing an example of functional configurations of the client device 10 and the server device 20 according to the embodiment.

The client device 10 includes a communication unit 11, a client control unit 12, and an imaging unit 13. For example, the communication unit 11 establishes wireless communication with the client-side communication control unit 30.

The communication unit 11 performs wireless communication in the available communication band of the client device 10. The available communication band of the client device 10 may be set by the own device or may be set in accordance with an instruction from an external device. Also, the available communication band of the client device 10 may be changed in accordance with an instruction from an external device.

For example, the client control unit 12 is a processor including a central processing unit (CPU) and the like and generally controls the client device 10. For example, when a command has been received from the server device 20 via the communication unit 11, the client control unit 12 causes the imaging unit 13 to start or stop imaging or sets imaging conditions such as a direction of the camera that performs imaging with respect to the imaging unit 13 and a magnification at the time of imaging in accordance with control from the server device 20.

The imaging unit 13 images a landscape at a predetermined location in accordance with an instruction from the client control unit 12. The imaging unit 13 outputs data obtained through imaging (imaging data) to the client control unit 12.

The server device 20 includes a communication unit 21, a server control unit 22, an imaging data storage unit 23, and an output unit 24. The communication unit 21 is, for example, an Ethernet (registered trademark) port of the server device 20. In the present embodiment, the communication unit 21 is connected to the server-side communication control device 31 via a wired cable and outputs data to be transmitted from the server device 20 to the client device 10 to the server-side communication control device 31.

For example, the server control unit 22 is a processor including a CPU and the like and generally controls the server device 20. For example, the server control unit 22 transmits a predetermined command to the client device 10. For example, the server control unit 22 causes the imaging data storage unit 23 to store imaging data obtained through imaging performed by the client device 10. The imaging data storage unit 23 stores the imaging data in accordance with an instruction of the server control unit 22.

Here, an example of a conventional system will be described. In the conventional system, when a client device and a server device are directly connected to each other via a communication unit and a network, the HTTP, which is a general communication protocol in a network monitoring camera, is used in communication between the client device and the server device. In this case, unencrypted information (so-called plaintext) output to the network by the client device or the server device flows through the network. In this case, if data on the network is maliciously acquired from the outside, there is a risk that imaging data can be easily intercepted or tampered with.

As a countermeasure against such an unauthorized attack, a case in which the client device encrypts the imaging data and outputs the encrypted imaging data to the network NW is conceivable. However, because a processor such as a CPU already provided in the monitoring camera is generally used for the purpose of compressing or encoding imaging data, a resource for performing an encryption process is not further provided. In this case, the CPU originally provided in the client device cannot encrypt imaging data. When the client device causes the imaging data to be encrypted, a case in which it is necessary to change or replace the hardware configuration of the client device such that the client device is further equipped with a processor for encrypting the imaging data is conceivable. However, because the client device is a component that constitutes a social infrastructure such as a monitoring camera, the hardware configuration cannot be easily changed or replaced. In view of such circumstances, it is desirable that imaging data be encrypted and output to the network without changing the client device.

In the present embodiment, the client-side communication control device 30 connected to the client device 10 and the network NW encrypts the data transmitted by the client device 10 and outputs the encrypted data to the network NW. The server-side communication control device 31 connected to the server device 20 and the network NW encrypts the control data transmitted by the server device 20 and outputs the encrypted control data to the network NW. Thereby, the security of the imaging data flowing through the network NW is improved without changing the client device 10 and the server device 20.

Figure 3:
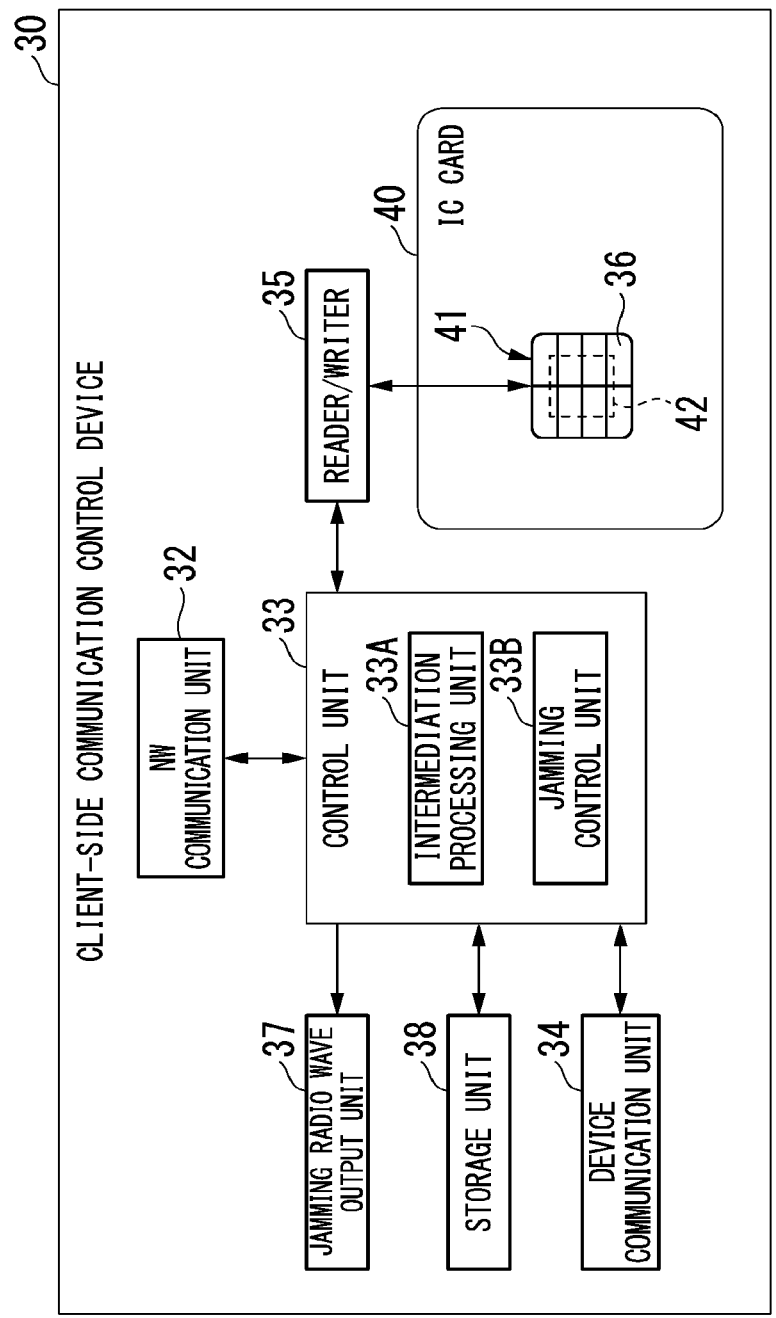
FIG. 3 is a block diagram showing an example of functional configurations of a client-side communication control device 30 and a server-side communication control device 31 according to the embodiment.

Next, configurations of the client-side communication control device 30 and the server-side communication control device 31 will be described. FIG. 3 is a block diagram showing an example of functional configurations of the client-side communication control device 30 and the server-side communication control device 31 according to the embodiment. The server-side communication control device 31 has the same functional configuration as the client-side communication control device 30. Thus, in the following, the configuration of the client-side communication control device 30 will be described and the description of the configuration of the server-side communication control device 31 will be omitted. Also, when the client-side communication control device 30 and the server-side communication control device 31 are not distinguished, they are simply referred to as the communication control device 30 (31) or the like.

As shown in FIG. 3, the communication control device 30 includes a network (NW) communication unit 32, a control unit 33, a device communication unit 34, a reader/writer 35, and an IC card 40. Here, the IC card 40 is an example of an "authentication unit."

The communication unit 32 is connected to the network NW and communicates with the server-side communication control device 31 via the network NW.

For example, the control unit 33 is a processor including a CPU and the like and controls the client-side communication control device 30 in an integrated manner. For example, the control unit 33 includes a mediation processing unit 33A, a jamming control unit 33B, a setter 33E, and a communication restrictor 33F. Some or all of these functional units are implemented by, for example, a processing unit such as a CPU executing a program (software) stored in the storage unit. Also, some or all of these components may be implemented by hardware (a circuit unit including circuitry) such as a large-scale integration (LSI) circuit, an application specific integrated circuit (ASIC), or a field-programmable gate array (FPGA) or may be implemented by software and hardware in cooperation.

The mediation processing unit 33A mediates the communication between the client device 10 and the server device 20. For example, the mediation processing unit 33A transmits a command to the IC card 40 via the reader/writer 35 on the basis of information received from the client device 10 via the device communication unit 34.

The mediation processing unit 33A receives a response from the IC card 40 and transmits information based on the response received from the IC card 40 to the server device 20 via the NW communication unit 32. Also, the mediation processing unit 33A transmits a command to the IC card 40 via the reader/writer 35 on the basis of the information received from the server-side communication control device 31 via the NW communication unit 32. The mediation processing unit 33A receives a response from the IC card 40 and transmits information based on the response received from the IC card 40 to the client device 10 via the device communication unit 34.

The jamming control unit 33B interferes with wireless communication between the client device 10 and a device other than the client-side communication control device 30 among devices, which attempt to perform wireless communication in the communication band used by the client device 10, by performing an operation of outputting jamming radio waves and the like. The jamming control unit 33B determines a frequency band or an output period of the jamming radio waves. The jamming control unit 33B controls a jamming radio wave output unit 37 so that the jamming radio waves of the determined frequency band are output. Also, the jamming control unit 33B controls the jamming radio wave output unit 37 so that the jamming radio waves are output for the determined output period. Also, the jamming control unit 33B may store the frequency band and the output period of the jamming radio waves that have been determined in the storage unit 38.

The jamming control unit 33B employs at least one of jamming methods to be described below.

First, an example of a first jamming method will be described. The jamming control unit 33B allows jamming radio waves to be output with a radio wave intensity at which communication between the client-side communication control device 30 and the client device 10 is possible in all frequency bands of an available communication band of the client device 10.

For example, the jamming control unit 33B determines a radio wave intensity on the basis of a relative positional relationship between the client device 10 and the client-side communication control device 30. For example, the jamming control unit 33B may acquire distance information about a distance between the client device 10 and the client-side communication control device 30 from a measurement result of a distance measurer (not shown) provided in the jamming control unit 33B or may acquire the distance information from an external device when the user performs an input using the external device. Thereby, when a communication intensity of the other communication control device 70 is weaker than a radio wave intensity of the client-side communication control device 30, it is possible to interfere with communication between the other communication control device 70 and the client device 10 and ensure communication between the client-side communication control device 30 and the client device 10.

Next, an example of a second jamming method will be described. The jamming control unit 33B allows jamming radio waves to be output in a band other than an available frequency band of the client-side communication control device 30 among communication bands which are used by the client device 10. Thereby, when the other communication control device 70 attempts to communicate with the client device 10 in a band other than the communication band used by the client device 10, it is possible to interfere with communication between the other communication control device 70 and the client device 10 and ensure communication between the client-side communication control device 30 and the client device 10.

Next, an example of a third jamming method will be described. The jamming control unit 33B allows jamming radio waves to be output in all available communication bands of the client device 10 at timing except for a period during which the client device 10 communicates with the client-side communication control device 30. For example, the jamming control unit 33R determines all but the period during which the client device 10 communicates with the client-side communication control device 30 as the output period. Thereby, the communication between the client-side communication control device 30 and the client device 10 is not affected by jamming radio waves and it is possible to interfere with communication between the other communication control device 70 and the client device 10.

Next, an example of a fourth jamming method will be described. The jamming control unit 33B limits the available communication band of the client device 10 to a band of communication with the client-side communication control device 30. In other words, the jamming control unit 33B causes wireless communication between the client device 10 and a device (for example, the other communication control device 70) other than the client-side communication control device 30 to be restricted, so that, for example, wireless communication between the client device 10 and the other communication control device 70 is interfered with.

In the fourth jamming method, the jamming control unit 33B instructs the client device 10 to set the available communication band of the client device 10. For example, the jamming control unit 33B instructs the client device 10 to set a first communication band to be used by the client device 10 among the available communication bands of the client device 10 as the available communication band of the client device 10. Here, the jamming control unit 33B may instruct the client device 10 to restrict wireless communication outside the first communication band so that the wireless communication outside the first communication band is not performed. Also, the jamming control unit 33B instructs the device communication unit 34 to communicate with the client device 10 in the first communication band. Thereby, the available communication band of the client device 10 is limited and the communication between the other communication control device 70 and the client device 10 can be interfered with in the limited communication band.

Also, the fourth jamming method can reduce a possibility that the other communication control device 70 will communicate with the client device 10 by combining the above-described first to third jamming methods.

Next, an example of a fifth jamming method will be described. The jamming control unit 33B limits the available communication band of the client device 10 to a band of communication with the client-side communication control device 30 and performs switching between the communication bands. For example, the jamming control unit 33B instructs the client device 10 to change the available communication band of the client device 10 to a second communication band. For example, the jamming control unit 33B may issue a change instruction when wireless communication with the client device 10 is started or may issue a change instruction periodically. Also, the jamming control unit 33B instructs the device communication unit 34 to communicate with the client device 10 in the second communication band. Thereby, because the available communication band of the client device 10 is limited and the available communication band is not fixed, it is possible to more effectively interfere with the communication between the other communication control device 70 and the client device 10.

Also, in the above-described first to fifth jamming methods, the jamming control unit 33B may instruct the client device 10 to transmit information about a communication function of the client device 10 (hereinafter referred to as function information) and determine at least one of the available communication band of the client device 10, the frequency band of the jamming radio waves, and the output period of the jamming radio wave on the basis of the acquired function information. For example, the function information includes an available communication band of the client device 10, an available communication band of the client device 10 that has been set at the present time, information about a communication channel capable of being set in the client device 10, and information about a communication channel set in the client device 10 at the present time.

Also, in the above-described first to fifth jamming methods, the jamming control unit 33B may instruct the client device 10 to transmit information about another communication control device that wirelessly communicated with the client device 10 in the past (hereinafter referred to as communication history information) and determine at least one of an available communication band of the client device 10, a frequency band of the jamming radio waves, and an output period of the jamming radio waves on the basis of acquired communication history information. For example, the communication history information includes information representing a communication band and a channel used by the client device 10 for wireless communication with another communication control device in the past and information representing a communication timing used by the client device 10 for wireless communication with the other communication control device in the past. Also, when a past history determined in the client-side communication control device 30 is stored in the storage unit 38, the communication history information may be based on information of the past history. For example, the jamming control unit 33R determines a communication band (or a channel) used by the client device 10 for wireless communication with another communication control device in the past as the frequency band of the jamming radio waves on the basis of a communication history report. Also, the jamming control unit 33B determines the communication timing used by the client device 10 for wireless communication with another communication control device in the past as the output period of the jamming radio waves on the basis of the communication history report.

The device communication unit 34 is connected to a device (the client device 10 or the server device 20) and communicates with the device. Specifically, the device communication unit 34 of the client-side communication control device 30 is connected to the client device 10, acquires imaging data from the client device 10, and outputs decrypted control data to the client device 10. The device communication unit 34 of the server-side communication control device 31 is connected to the server device 20, acquires control data from the server device 20, and outputs decrypted imaging data to the server device 20.

The reader/writer 35 performs communication with the IC card 40 via a contact unit 36 of the IC card 40.

The jamming radio wave output unit 37 outputs radio waves of a frequency band and a radio wave intensity specified by the jamming control unit 33B. Also, the jamming radio wave output unit 37 continuously outputs the jamming radio waves for the output period specified by the jamming control unit 33B. The jamming radio waves are, for example, radio waves including noise for jamming communication in a designated frequency band.

For example, the storage unit 38 is implemented by a RAM, a ROM, or the like. The storage unit 38 stores a program to be executed by the processor and also stores the frequency band, the output period, and the like of the jamming radio waves determined by the jamming control unit 33B.

The IC card 40 is formed, for example, by mounting an IC module 41 on a plastic card substrate. That is, the IC card 40 includes the IC module 41 and a card substrate in which the IC module 41 is embedded.

The IC module 41 includes the contact unit 36 and the IC chip 42. The contact unit 36 has terminals for various types of signals necessary for the operation of the IC card 40. Here, the terminals for various types of signals include terminals for receiving a power supply voltage, a clock signal, a reset signal, and the like from the communication control device 30 (31) and serial data input and output terminals (SIO terminals) for communicating with the communication control device 30 (31). For example, the IC chip 42 is large scale integration (LSI) such as a one-chip microprocessor.

The IC card 40 is removably mounted in the client-side communication control device 30 and can communicate with the client-side communication control device 30 via the contact unit 36. For example, the IC card 40 receives a command (a process request) transmitted by the client-side communication control device 30 via the contact unit 36 and executes a process (command processing) according to the received command. The IC card 40 transmits a response (a processing response), which is a result of executing the command processing, to the client-side communication control device 30 via the contact unit 36.

Figure 4:
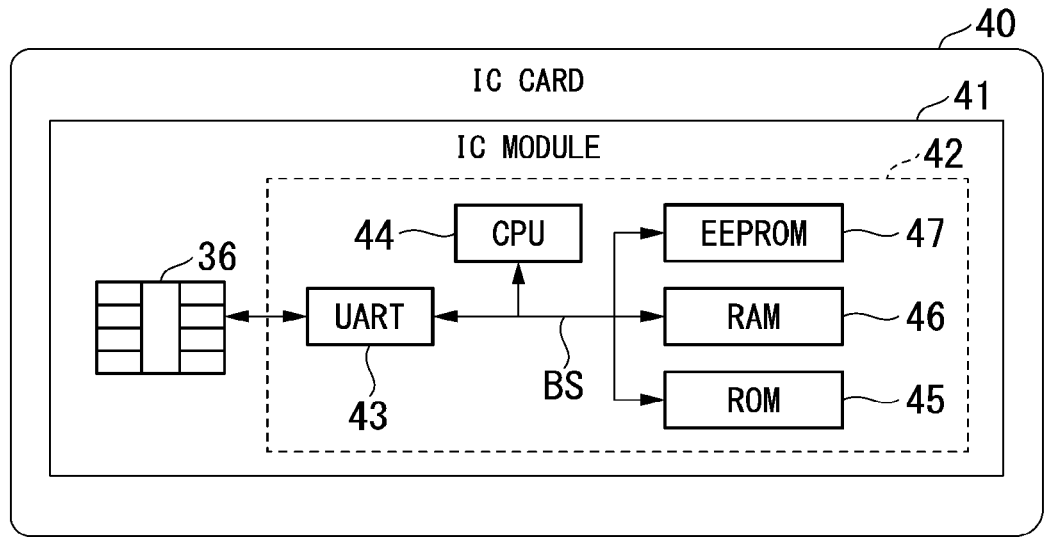
FIG. 4 is a diagram showing an example of a hardware configuration of an IC card 40 according to the embodiment.

Next, an example of a hardware configuration of the IC card 40 will be described. FIG. 4 is a diagram showing an example of a hardware configuration of the IC card 40 according to the embodiment.

As described above, the IC card 40 includes the IC module 41 having the contact unit 36 and the IC chip 42. The IC chip 42 includes a universal asynchronous receiver transmitter (UART) 43, a CPU 44, a read only memory (ROM) 45, a random access memory (RAM) 46, and an electrically erasable programmable ROM (EEPROM) 47. The respective components (43 to 47) are connected via an internal bus BS.

The UART 43 performs serial data communication with the client-side communication control device 30 via the SIO terminal described above. The UART 43 outputs data (for example, 1-byte data) obtained by converting the serial data signal received via the SIO terminal into parallel data to the internal bus BS. The UART 43 converts data acquired via the internal bus BS into serial data and outputs the serial data to the client-side communication control device 30 via the SIO terminal. For example, the UART 43 receives a command from the client-side communication control device 30 via the SIO terminal. The UART 43 transmits a response to the communication control device 30 via the SIO terminal.

The CPU 44 executes various types of processes of the IC card 40 by executing a program stored in the ROM 45 or the EEPROM 47. For example, the CPU 44 executes command processing according to the command received by the UART 43 via the contact unit 36.

For example, the ROM 45 is a non-volatile memory such as a mask ROM and stores data such as a program for executing various processes of the IC card 40 and a command table. For example, the RAM 46 is a volatile memory such as a static RAM (SRAM) and temporarily stores data used when various types of processes of the IC card 40 are performed. The EEPROM 47 is, for example, an electrically rewritable nonvolatile memory. The EEPROM 47 stores various types of data used by the IC card 40. For example, the EEPROM 47 stores information used for various types of services (applications) using the IC card 40.

Figure 5:
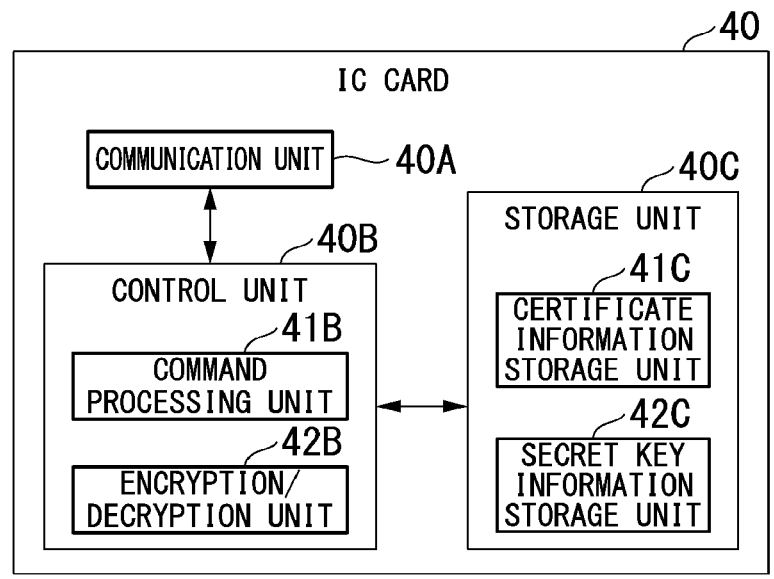
FIG. 5 is a block diagram showing an example of a functional configuration of the IC card 40 according to the embodiment.

Next, an example of a configuration of the IC card 40 will be described. FIG. 5 is a block diagram showing an example of a functional configuration of the IC card 40 according to the embodiment. The IC card 40 includes a communication unit 40A, a control unit 40B, and a storage unit 40C. Here, each part of the IC card 40 shown in FIG. 5 is implemented using the hardware of the IC card 40 shown in FIG. 4.

The communication unit 40A is implemented by, for example, the UART 43, the CPU 44, and a program stored in the ROM 45, and, for example, transmits and receives a command and a response to and from the client-side communication control device 30 via the contact unit 36. That is, the communication unit 40A receives a command (a processing request) for requesting a predetermined process from the client-side communication control device 30 and transmits a response (a processing response) to the command to the client-side communication control device 30. The communication unit 40A causes the RAM 46 to store received data received from the client-side communication control device 30 via the UART 43. The communication unit 40A transmits transmission data stored in the RAM 46 to the client-side communication control device 30 via the UART 43.

The control unit 40B is implemented by, for example, the CPU 44, the RAM 45, the ROM 46, or the EEPROM 47, and generally controls the IC card 40. The control unit 40B includes a command processing unit 41B and an encryption/decryption unit 42B.

Here, a process to be performed by the command processing unit 41B is an example of an "authentication process". A process to be performed by the encryption/decryption unit 42B is an example of an "encryption/decryption process".

The command processing unit 41B executes various types of command processing. For example, the command processing unit 41B performs an SSL/TLS handshake as command processing for transmitting an HTTPS request to be described below. In the SSL/TLS handshake, key information necessary for encrypted communication and the like is exchanged and mutual authentication with a communication destination device is performed. Here, the mutual authentication is an authentication process in which the client-side communication control device 30 and the server-side communication control device 31 mutually check that they are devices that are properly authenticated before communication is performed.

The encryption/decryption unit 42B executes a process of encrypting data and a process of decrypting encrypted data. The encryption/decryption unit 42B encrypts the data received from the client device 10 (the server device 20 in the case of the server-side communication control device 31) via the communication unit 40A. Also, the encryption/decryption unit 42B decrypts the encrypted data received from the server device 20 (the client device 10 in the case of the server-side communication control device 31) through the communication unit 40A via the network NW.

The storage unit 40C is, for example, a storage including the EEPROM 47 and includes a certificate information storage unit 41C and a secret information storage unit 42C. The certificate information storage unit 41C stores a certificate for the client device 10 (the server device 20 in the case of the server-side communication control device 31) issued by the communication control management device 50. Specifically, the certificate information storage unit 41C of the IC card 40 mounted in the client-side communication control device 30 stores information representing the client certificate. Also, the certificate information storage unit 41C of the IC card 40 mounted in the server-side communication control device 31 stores information representing the server certificate.

The secret information storage unit 42C stores the secret key for the client device 10 (the server device 20 in the case of the server-side communication control device 31) issued by the communication control management device 50. Specifically, the secret information storage unit 42C of the IC card 40 mounted in the client-side communication control device 30 stores information representing the secret key issued to the client-side communication control device 30. Also, the certificate information storage unit 41C of the TC card 40 mounted in the server-side communication control device 31 stores information representing a secret key issued to the server-side communication control device 31.

Figure 6:
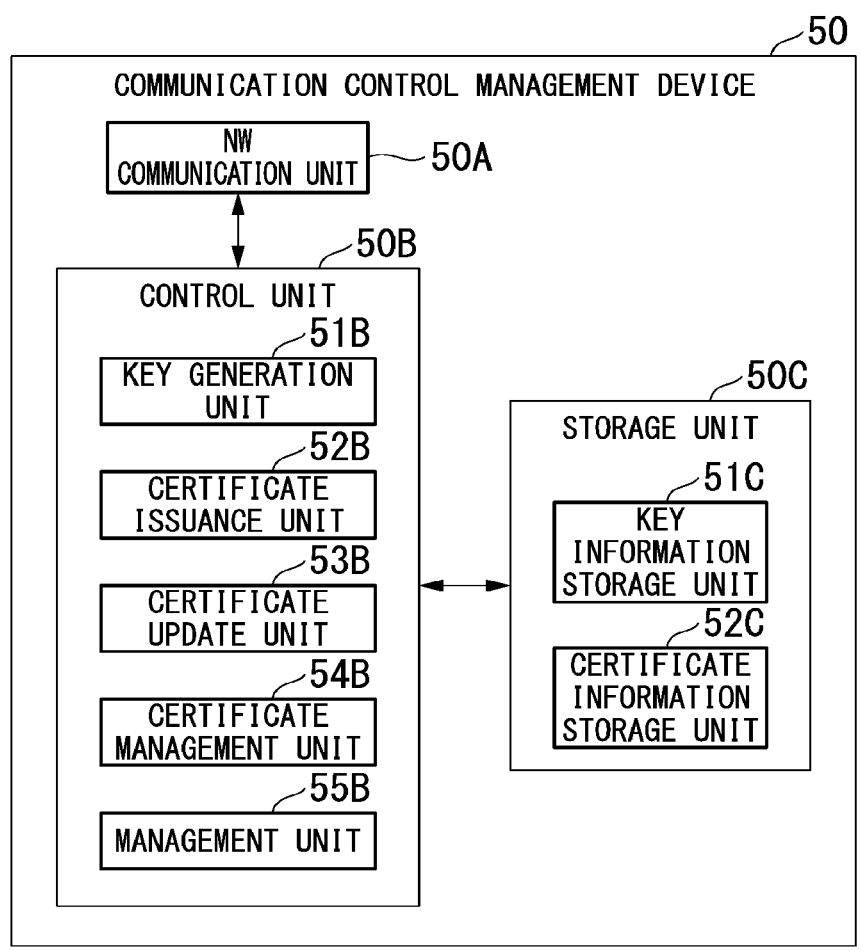
FIG. 6 is a block diagram showing an example of a functional configuration of a communication control management device 50 according to the embodiment.

Next, an example of a configuration of the communication control management device 50 will be described. FIG. 6 is a block diagram showing an example of a functional configuration of a communication control management device 50 according to the embodiment. The communication control management device 50 includes, for example, an NW communication unit 50A, a control unit 50B, and a storage unit 50C.

The NW communication unit 50A is connected to the network NW and communicates with the communication control device 30 (31) via the network NW.

For example, the control unit SOB is a processor including a CPU and the like and generally controls the communication control management device 50. The control unit 50B mainly functions as a private certificate authority that recognizes the validity of the communication control device 30 (31). The control unit 50B includes a key generation unit 51B, a certificate issuance unit 52B, a certificate update unit 53B, a certificate management unit 54B, and a management unit 55B.

For example, the key generation unit 51B issues a secret key corresponding to a public key included in a certificate to be described below on the basis of an authentication request from the communication control device 30 (31).

For example, the certificate issuance unit 53B issues a certificate that recognizes the validity of the communication control device 30 (31) on the basis of the authentication request from the communication control device 30 (31). The certificate includes a public key and information indicating an owner of the communication control device 30 (31).

The certificate update unit 53B updates the certificate by setting a new validity period for the certificate whose validity period has expired. The certificate update unit 53B issues, for example, a certificate in which the validity period of the certificate issued to the communication control device 30 (31) is extended on the basis of an update request from the communication control device 30 (31) and transmits the issued certificate to the communication control device 30 (31). Information indicating the issued certificate is received by the communication control device 30 (31) and stored in the certificate information storage unit 41C of the IC card 40 of the communication control device 30 (31), so that the validity period of the certificate of the communication control device 30 (31) is extended.

The certificate management unit 54B manages certificates that have already been issued. For example, the certificate management unit 54B performs a process of invalidating the certificate issued to the communication control device 30 (31) when validity in mutual authentication has not been mutually proved due to falsification, theft, or the like of the IC card 40 attached to the communication control device 30 (31). The certificate management unit 54B may be configured to respond regarding whether or not certificates issued to the communication control device 30 (31) and other communication devices have been issued by the certificate management unit 54B on the basis of an inquiry from the communication control device 30 (31). The certificate management unit 54B may be configured to periodically check whether the issued certificate is being used in the valid communication control device 30 (31).

The management unit 55B manages the communication control device 30 (31). For example, the management unit 55B remotely controls the mutual authentication to be performed by the communication control device 30 (31) via the network NW.

The storage unit 50C includes, for example, a key information storage unit 51C and a certificate information storage unit 52C. For example, the key information storage unit 51C stores information indicating a public key or a secret key that has already been issued. For example, the certificate information storage unit 52C stores information indicating a certificate that has already been issued. The key information storage unit 51C and the certificate information storage unit 52C are referred to, for example, when the key generation unit 51B issues a secret key, when the certificate issuance unit 52B issues a certificate, or the like. The key information storage unit 51C stores information indicating the secret key issued by the key generation unit 51B. The certificate information storage unit 52C stores information indicating the certificate issued by the certificate issuance unit 52B.

Figure 7:
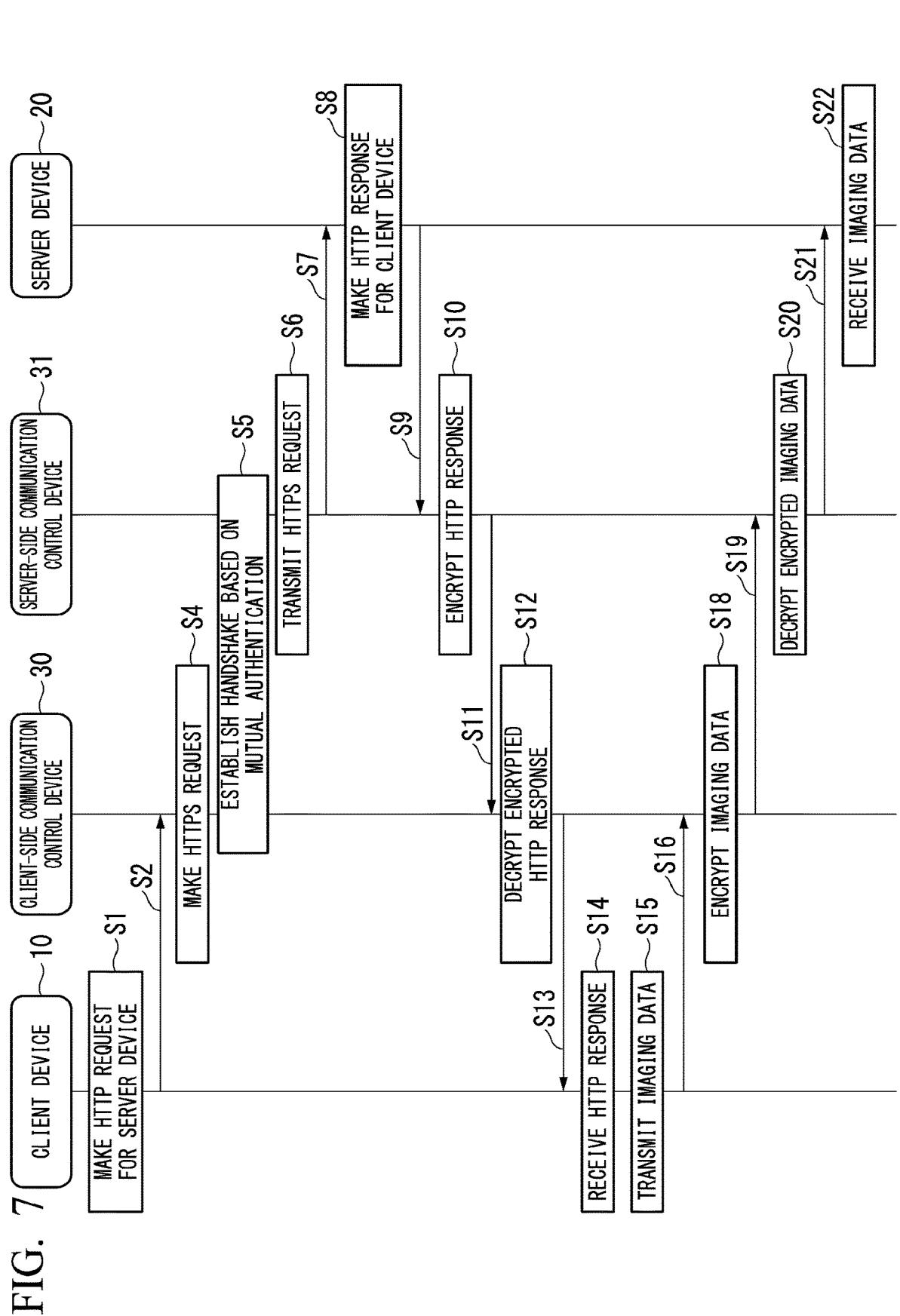
FIG. 7 is a sequence chart showing an example of a process to be performed by the communication control system 1 according to the embodiment.

Next, an example of a process performed by the communication control system 1 will be described. FIG. 7 is a sequence chart showing an example of a process to be performed by the communication control system 1 according to the embodiment.

The client device 10 first transmits an HTTP request to the server device 20 when imaging data is transmitted to the server device 20 (step S1). The HTTP request transmitted by the client device 10 is acquired by the client-side communication control device 30 (step S2). The client-side communication control device 30 transmits an HTTPS request (ClientHello) to the server-side communication control device 31 (step S4). Thereby, a handshake is started in communication between the client-side communication control device 30 and the server-side communication control device 31 (step S5).

Specifically, ClientHello transmitted by the client-side communication control device 30 includes, for example, information indicating a TLS version and a list of encryption schemes or algorithms used for communication. The server-side communication control device 31 transmits an HTTPS response (ServerHello) to the client-side communication control device 30 as a response to ClientHello. ServerHello transmitted by the server-side communication control device 31 includes, for example, information selected by the server device 20 among options presented in ClientHello. In other words, a specific encryption algorithm in communication is determined by the server-side communication control device 31 performing selection with respect to the presentation from the client-side communication control device 30.

Then, the server-side communication control device 31 transmits information necessary for the common key for use in encrypted communication. For example, information necessary for the common key includes information indicating the public key issued to the server device 20 and its certificate and information for requesting the transmission of the public key of the client device 10 and its certificate. The client-side communication control device 30 transmits information necessary for the public key issued to its own device and its certificate and the common key for use in encrypted communication to the server-side communication control device 31.

For example, mutual authentication in communication between the client-side communication control device 30 and the server-side communication control device 31 is performed as follows. The client-side communication control device 30 generates a signature from ServerHello or the like received so far and transmits the signature to the server-side communication control device 31. The server-side communication control device 31 verifies the signature received from the client-side communication control device 30 on the basis of the certificate received from the client-side communication control device 30. If verification is successful, the server-side communication control device 31 determines that the certificate is definitely a certificate of the client-side communication control device 30. The server-side communication control device 31 generates a signature from ClientHello or the like received so far and transmits the signature to the client-side communication control device 30. The client-side communication control device 30 verifies the signature received from the server-side communication control device 31 on the basis of the certificate received from the server-side communication control device 31. If the verification is successful, the client-side communication control device 30 determines that the certificate is definitely a certificate of the server-side communication control device 31.

When mutual authentication in communication between the client-side communication control device 30 and the server-side communication control device 31 is correctly performed, each of the client-side communication control device 30 and the server-side communication control device 31 generates and exchanges a common key for use in encryption.

When a common key and a certificate, which are transmitted from the server-side communication control device 31 and issued for the server device 20, are authorized by the client-side communication control device 30 and a common key and a certificate, which are transmitted from the client-side communication control device 30, are authorized by the server-side communication control device 31, the server-side communication control device 31 ends the handshake.

When the handshake with the client-side communication control device 30 is established, the server-side communication control device 31 transmits an HTTP request to the server device 20 (step S6). The HTTP request transmitted here is the HTTP request received from the client device 10 in step S2.

The HTTP request transmitted by the server-side communication control device 31 is received by the server device 20 (step S7). At this time, the server device 20 recognizes that the HTTP request from the client device 10 has been made. Thus, the server device 20 responds to the client device 10 with an HTTP response (step S8). The HTTP response transmitted by the server device 20 is acquired by the server-side communication control device 31 (step S9).

The server-side communication control device 31 encrypts the acquired HTTP response from the server device 20 using the common key determined in the handshake in step S5 (step S10). The HTTP response encrypted by the server-side communication control device 31 is received by the client-side communication control device 30 via the network NW (step S11). The client-side communication control device 30 decrypts the received HTTP response using the common key (step S12). The HTTP response decrypted by the client-side communication control device 30 is acquired by the client device 10 (step S13). The client device 10 receives the decrypted HTTP response (step S14). At this time, the client device 10 recognizes that an HTTP response has been transmitted from the server device 20. Thus, the client device 10 transmits imaging data to the server device 20 (step S15).

The imaging data transmitted by the client device 10 is acquired by the client-side communication control device 30 (step S16). The client-side communication control device 30 encrypts the imaging data transmitted by the client device 10 using a common key (step S18). The imaging data encrypted by the client-side communication control device 30 is received by the server-side communication control device 31 via the network NW (step S19).

The server-side communication control device 31 decrypts the received imaging data using the common key (step S20). The imaging data decrypted by the server-side communication control device 31 is acquired by the server device 20 (step S21). The server device 20 receives the decrypted imaging data (step S22). At this time, the server device 20 recognizes that the imaging data from the client device 10 has been received.

When the mutual authentication between the client-side communication control device 30 and the server-side communication control device 31 has not been correctly performed in step S5 of the above-described flowchart, the client-side communication control device 30 does not permit communication with the communication destination. Specifically, the client-side communication control device 30 does not output the information transmitted from the communication destination to the client device 10. This is because, when the mutual authentication has not been correctly performed, there is a possibility that the communication destination will be an unauthorized communication device pretending to be the server-side communication control device 31. In this case, for example, the client-side communication control device 30 may be configured to transmit a communication record when the mutual authentication has not been correctly performed to the communication control management device 50. Accordingly, the communication control management device 50 can acquire a communication record when the mutual authentication has not been correctly performed, and monitor abnormalities of a network by ascertaining a pattern or frequency of unauthorized communication with the client-side communication control device 30 under management.

The client-side communication control device 30 may be configured to determine whether or not to permit communication with the communication destination on the basis of a transmission destination list indicating information of communication equipment with which the client device 10 is permitted to perform communication instead of mutual authentication in the handshake performed in step S5 of the above-described flowchart. The communication device information shown in the transmission destination list is, for example, a uniform resource locator (URL). The control unit 33 of the client-side communication control device 30 permits communication with the communication destination when the URL of the communication destination is a URL registered in the transmission destination list and does not permit communication when the URL of the communication destination is not registered in the transmission destination list.

The control unit 33 may be configured to update the transmission destination list. For example, the control unit 33 causes a URL of a communication destination permitted to communicate with the client device 10 for a fixed period and a URL of a communication destination which is not permitted to communicate with the client device 10 to be stored. Then, for example, the control unit 33 updates the transmission destination list by re-registering a URL of a communication destination with which communication has been performed for a fixed period among the URLs registered in the transmission destination list and the like. Alternatively, the client-side communication control device 30 may be configured to transmit a communication destination URL for which communication is permitted for a fixed period and a communication destination URL for which no communication is permitted to the communication control management device 50. In this case, for example, the communication control management device 50 may be configured to update the transmission destination list on the basis of the communication destination URL that communicates with the client-side communication control device 30. By updating the transmission destination list in the communication control management device 50, communication equipment that communicates with the client-side communication control device 30 under the management of the communication control management device 50 can be collectively managed.

The client-side communication control device 30 may be configured to verify whether or not details of information (for example, an update program of firmware) transmitted to the client device 10 after the handshake performed in step S5 is established are correct. For example, when the update program of firmware of the client device 10 has been transmitted via the network NW, the control unit 33 of the client-side communication control device 30 performs verification using a verification key. In this case, for example, the communication control management device 50 may be configured to transmit the verification key to each of the client-side communication control device 30 and the server-side communication control device 31.

For example, the server-side communication control device 31 generates a hash value from information (plaintext) that is transmitted to the client device 10 and encrypts the generated hash value with a verification key. Then, the server-side communication control device 31 further encrypts the plaintext and the encrypted hash value with a secret key and transmits an encryption result to the client device 10. The client-side communication control device 30 decrypts information using the common key and acquires the plaintext and the encrypted hash value.

The client-side communication control device 30 generates a hash value from the acquired plaintext and decrypts the encrypted hash value with the verification key. When the hash value generated from the plaintext and the decrypted hash value are equal, the client-side communication control device 30 determines that the information transmitted to the client device 10 is correct details. In this case, the client-side communication control device 30 outputs the decrypted information (plaintext) to the client device 10. On the other hand, when the hash value generated from the plaintext and the decrypted hash value are not equal, the client-side communication control device 30 determines that there is a possibility that information transmitted to the client device 10 can be unauthorized information transmitted from an unauthorized communication device pretending to be the server device 20 or the server-side communication control device 31. In this case, the client-side communication control device 30 does not output the decrypted information (plaintext) to the client device 10.

Thereby, the client device 10 can receive only information verified to be verified correct details. Though, normally, the client device 10 generally determines whether or not details of the update program are correct when the firmware is updated, the server-side communication control device 31 verifies details of the information transmitted to the client device 10 instead of the client device 10 and thereby the processing load of the client device 10 can be reduced.

Figure 8:
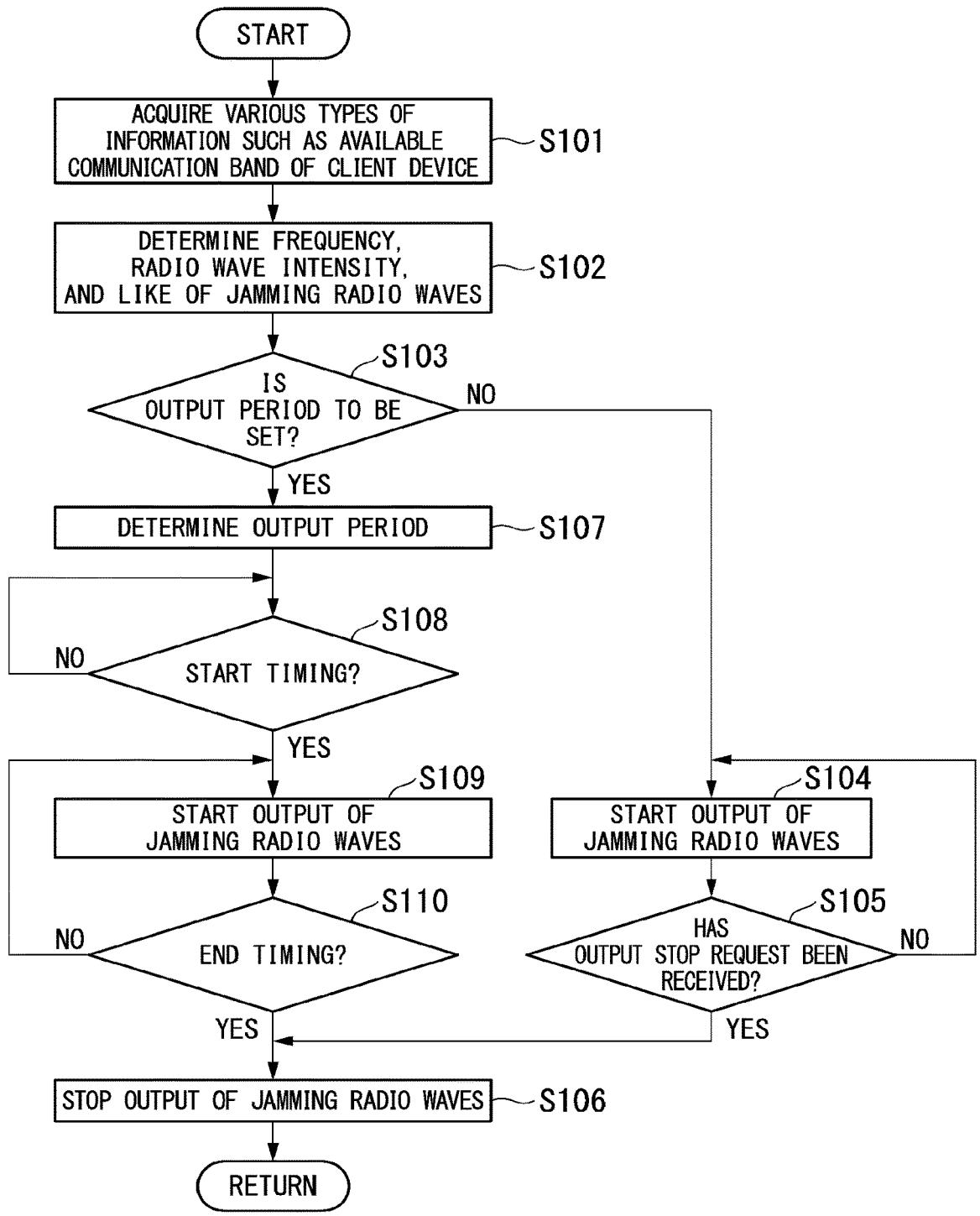
FIG. 8 is a flowchart showing an example of a jamming process of the client-side communication control device 30 according to the embodiment.

Next, an example of a jamming process of the client-side communication control device 30 will be described. FIG. 8 is a flowchart showing the example of the jamming process of the client-side communication control device 30 according to the embodiment. Here, the various jamming methods described above will be described together.

First, the jamming control unit 33B acquires information representing an available communication band of the client device 10 and the like (step S101). The jamming control unit 33B may communicate with the client device 10 to acquire information or may communicate with another external device to acquire information. Also, the jamming control unit 33B may acquire the above-described function information or communication history information from the client device 10.

Next, the jamming control unit 33B determines a frequency band and a radio wave intensity of jamming radio waves on the basis of the acquired information (step S102). For example, the radio wave intensity of the jamming radio waves is determined within a range in which communication with the client device 10 is possible in the first jamming method and the frequency band of the jamming radio waves is determined within a band outside an available communication frequency of the client-side communication control device 30 in the second jamming method. Also, the frequency band of the jamming radio waves may be determined on the basis of the frequency band determined in the fourth and fifth jamming methods. For example, as in the first and second jamming methods, when the output period is not to be set (NO in step S103), the jamming control unit 33B causes the output of the jamming radio waves to be started (step S104). When a jamming radio wave output stop request has been received from the communication control management device 50, the client device 10, or another external device (YES in step S105), the jamming control unit 33B stops the output of the jamming radio waves (step S106).

On the other hand, for example, as in the third jamming method, when the output period is to be set (YES in step S103), the jamming control unit 33B determines the entire period other than a period during which the client device 10 and the client-side communication control device 30 communicate with each other as the output period (step S107). When a start timing has been reached (YES in step S108), the jamming control unit 33B controls the jamming radio wave output unit 37 so that the jamming radio wave output unit 37 causes the output of the jamming radio waves to be started (step S109), and causes the jamming radio waves to be continuously output until an end timing is reached. When the end timing has been reached (YES in step S110), the jamming control unit 33B causes the output of the jamming radio waves to be stopped (step S106).

Figure 9:
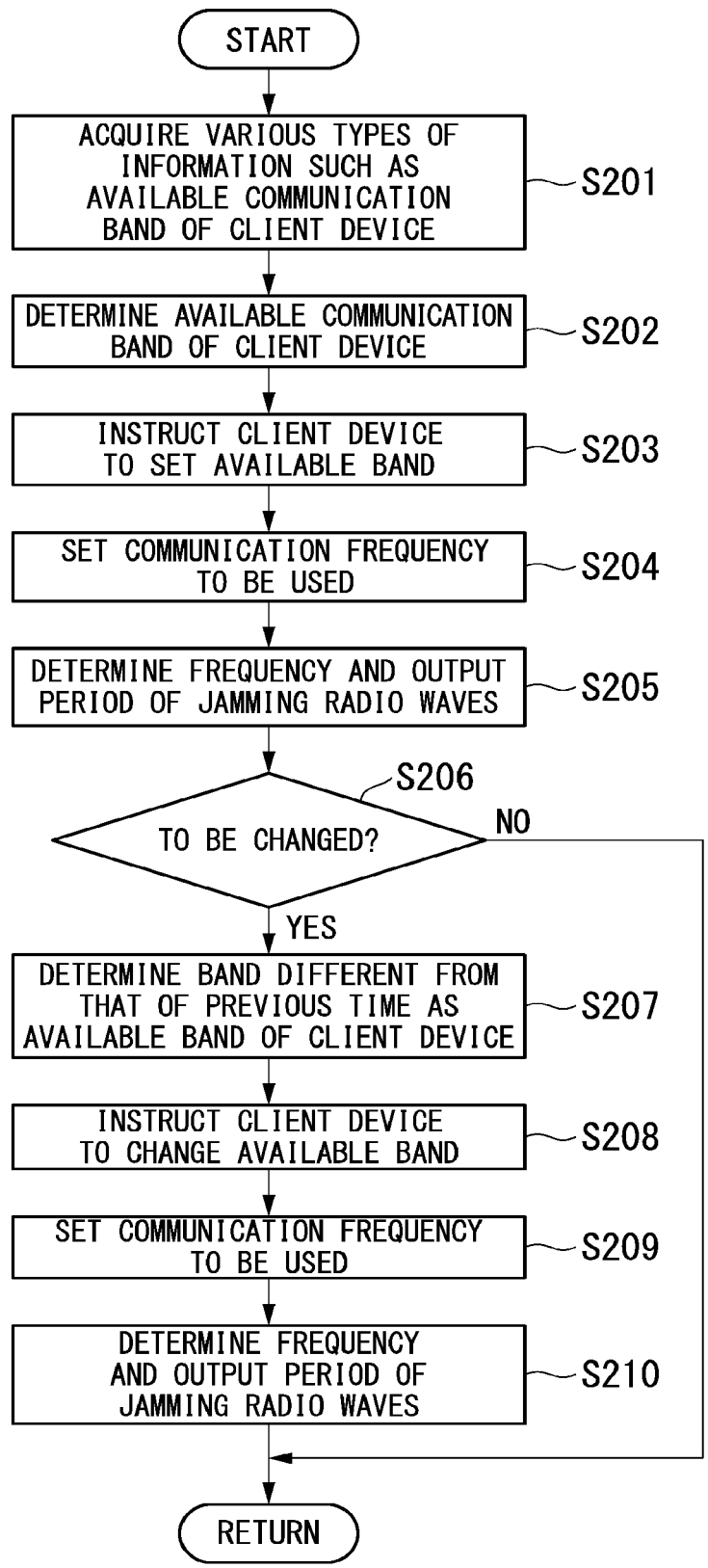
FIG. 9 is a flowchart showing another example of a jamming process of the client-side communication control device 30 according to the embodiment.

Next, another example of the jamming process of the client-side communication control device 30 will be described. FIG. 9 is a flowchart showing the other example of the jamming process of the client-side communication control device 30 according to the embodiment. Here, the above-described fourth and fifth jamming methods will be described together. The jamming control unit 33B executes the following process when the client device 10 can set or change an available communication band in accordance with an instruction from the external device. The jamming process shown in FIG. 9 may be executed before the jamming process shown in FIG. 8 or may be executed in parallel with the jamming process shown in FIG. 8.

First, the jamming control unit 33B acquires information representing the available communication band of the client device 10, function information, communication history information, and the like from the client device 10 (step S201). The jamming control unit 33B determines the available communication band of the client device 10 on the basis of the acquired information (step S202). For example, the jamming control unit 33B determines the communication band to be used by the client-side communication control device 30 within a minimum range necessary for communicating with the client-side communication control device 30 and determines the determined communication band as the available communication band of the client device 10. The jamming control unit 33B instructs the client device 10 to perform communication only in the determined communication band using the device communication unit 34 (step S203). The jamming control unit 33B instructs the device communication unit 34 to perform communication in the communication band used by the client-side communication control device 30 (step S204). Here, the jamming control unit 33B may determine the frequency band and the output period of the jamming radio waves on the basis of the information acquired in step S201 (step S205).

Next, the jamming control unit 33B determines whether or not the set available communication band of the client device 10 is to be changed (step S206). For example, when a predetermined time period has elapsed from the previous setting, it is determined that the set available communication band of the client device 10 is to be changed. When the set available communication band of the client device 10 is to be changed, the jamming control unit 33B determines at least a band different from that of the previous time as the available communication band of the client device 10 on the basis of the acquired information (step S207). Also, information representing a previously available communication band may be acquired from the client device 10 or may be acquired from a record in the own device. The jamming control unit 33B instructs the client device 10 to change the available communication band of the client device 10 to the communication band determined in step S207 (step S208). The jamming control unit 33B instructs the device communication unit 34 to perform communication in the communication band used by the client-side communication control device 30 changed in step S207 (step S209). Here, the jamming control unit 33B may determine the frequency band and the output period of the jamming radio waves on the basis of the information acquired in step S201, the change result, and the like (step S210).

Second Embodiment

Figure 10:
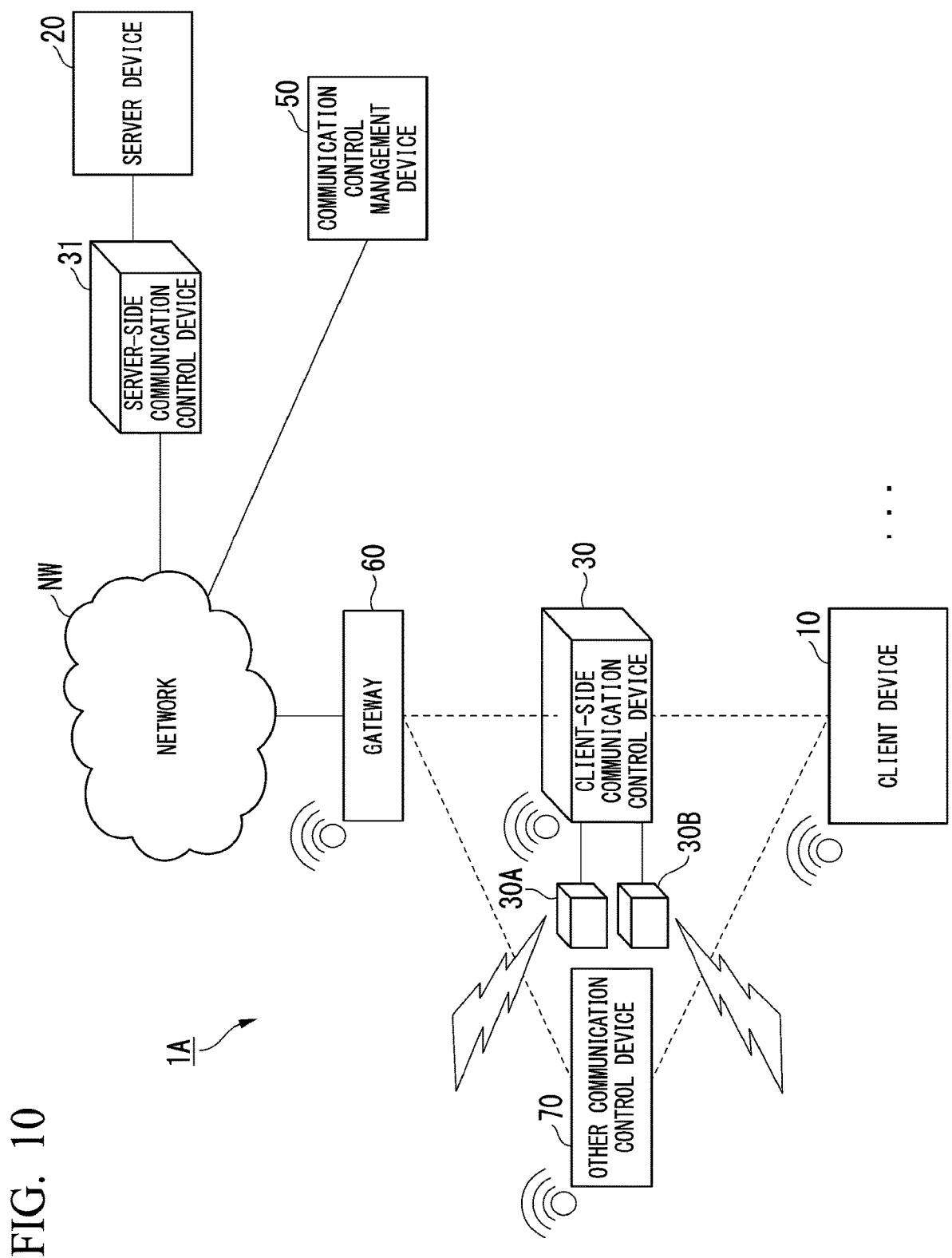
FIG. 10 is a diagram showing an example of a configuration of a communication control system 1A according to a second embodiment.

FIG. 10 is a diagram showing an example of a configuration of a communication control system 1A according to a second embodiment. The communication control system 1A is different from the communication control system 1 in that jamming radio wave output devices 30A and 30B are provided. The jamming radio wave output devices 30A and 30B are connected to the client-side communication control device 30 in a wired or wireless mode. The jamming radio wave output devices 30A and 30R output jamming radio waves of a specified frequency band and radio wave intensity for a designated output period in accordance with an instruction of the client-side communication control device 30. For example, the jamming radio wave output devices 30A and 30B are installed at positions that do not interfere with the communication between the client-side communication control device 30 and the client device 10. The position where the communication between both devices is not interfered with is, for example, a position in a direction away from the client device 10 with respect to the client-side communication control device 30 or the like.

According to this configuration, the communication between the client device 10 and the client-side communication control device 30 is unlikely to be affected by jamming radio waves.

As described above, the communication control system 1 according to the embodiment includes the NW communication unit 32 configured to wirelessly communicate with the client device 10 and upload information acquired from the client device 10 to the server device 20 via the network NW; and the jamming control unit 33B configured to allow jamming radio waves to be output to interfere with wireless communication between the client device 10 and a device other than an own device, the device being configured to perform wireless communication in a communication band used by the client device 10, so that it is possible to provide a communication control device capable of improving the security of a social infrastructure system without changing the social infrastructure system.

The communication control system 1 of the embodiment includes the client-side communication control device 30 connected to the client device 10 and the network NW and the server-side communication control device 31 connected to the server device 20 and the network NW. The client-side communication control device 30 includes an IC card 40 and a control unit 33. The control unit 33 requests the IC card 40 to perform at least one of a mutual authentication process and an encryption/decryption process, transmits encrypted information to the server-side communication control device 31, and transmits decrypted information to the client device 10. The server-side communication control device 31 includes an IC card 40 and a control unit 33. The control unit 33 requests the IC card 40 to perform at least one of a mutual authentication process and an encryption/decryption process, transmits encrypted information to the client-side communication control device 30, and transmits decrypted information to the server device 20. In this case, the control unit 33 of the communication control device 30 (31) may cause the IC card 40 to perform only the mutual authentication process, perform only the encryption/decryption processing, or perform both the mutual authentication process and the encryption/decryption process.

Thereby, the communication control system 1 of the embodiment can improve the security of the social infrastructure system without changing the social infrastructure system. This is because imaging data (so-called plaintext) of an HTTP protocol transmitted from the client device 10 to the server device 20 is combined with, for example, the SSL/TLS protocol, by the client-side communication control device 30 and is replaced with imaging data of HTTPS in which security is improved. Because the control data transmitted by the server device 20 to the client device 10 is encrypted, but is decrypted by the client-side communication control device 30 and received by the client device 10, it is unnecessary to cause the client device 10 to perform a decryption process and an existing device can be used as it is without any change.

In the communication control system 1 of the embodiment, because the client-side communication control device 30 and the server-side communication control device 31 perform mutual authentication, security can be improved as compared with a case in which authentication is performed only in one direction. Because an unspecified number of client terminals communicate with the server terminal in general client and server terminals, it is not realistic to issue and continuously manage valid client certificates with respect to an unspecified number of client terminals. However, in the social infrastructure system, a relationship between the client device 10 and the server device 20 is clearly identified. Thus, the client-side communication control device 30 and the server-side communication control device 31 can perform mutual authentication and can improve security.

In the case of a client terminal that does not have a client certificate, an ID and a password issued by the server terminal are required to be input for communicating with the server terminal. In such password authentication, a long-text string in which characters and numbers are combined may be required with respect to the password, or periodic password changes and the like may be required, to maintain security. However, when the number of passwords to be remembered increases, management may become troublesome and passwords may leak in a case in which passwords are left in memos or are recorded in a web browser or the like.

On the other hand, in the communication control system 1 of the embodiment, the client-side communication control device 30 has a client certificate, so that mutual authentication can be reliably performed in communication with the server device 20. Thus, password authentication becomes unnecessary. Thus, the effort and time for inputting a password and periodically changing and managing the password are eliminated and user convenience is improved. That is, security can be maintained without imposing a burden on the user.

When a client terminal that does not have a client certificate communicates with a server terminal on the basis of authentication of an ID or a password, anyone can communicate with the server terminal if the ID and the password can be correctly input. Thus, it is possible to illegally hijack the client terminal and have unauthorized access to the server terminal. Thus, for example, there is a possibility that the function of the client terminal will be limited by the server terminal that has been illegally hijacked and that the terminal will be infected with ransomware for requesting a ransom for release.

On the other hand, in the communication control system 1 according to the embodiment, when mutual authentication is performed between the client device 10 and the server device 20 via the communication control device 30 (31), when the client device 10 of the communication partner is restricted on the basis of address information, or the like, the client device 10 and the server device 20 are not illegally hijacked. That is, the communication control system 1 according to the embodiment can take countermeasures against ransomware.

For example, when there is a terminal (also called a stray device) for which there is no management unit within the network, the terminal may be used as an unauthorized terminal that performs an attack of malware or the like due to the unauthorized hijacking of the terminal. On the other hand, in the communication control system 1 according to the embodiment, when mutual authentication is performed between the client device 10 and the server device 20 via the communication control device 30 (31), when the client device 10 of the communication partner is restricted on the basis of address information, or the like, it is possible to prevent a terminal from being infected with malware or the like even if the terminal for which a management unit is absent inside the network NW is illegally hijacked and used for attacks.

In the communication control system 1 of the embodiment, the server device 20 is connected to the server-side communication control device 31 and no authentication process is performed inside the server device 20. Thus, it is not necessary to hold a certificate or the like inside the server device 20 and it becomes clear that the server device 20 connected to the server-side communication control device 31 is under the management of the communication control management device 50. However, when the server device 20 already has a functional unit corresponding to the server-side communication control device 31, the server-side communication control device 31 is not necessarily required to be physically connected to the server device 20 and the network NW. In this case, an authentication process is performed in communication with the client-side communication control device 30 by a functional unit corresponding to the server-side communication control device 31 originally provided in the server device 20.

In the communication control system 1 of the embodiment, the control unit 40B of the IC card 40 causes at least one of a mutual authentication process and an encryption/decryption process to be performed. Thus, the device cost of the communication control device 30 (31) can be reduced.

Although an example in which the IC card 40 attached to the communication control device 30 (31) performs at least one of a mutual authentication process and an encryption/decryption process in the communication control system 1 of the embodiment has been described, the functional unit for performing the process is not limited to the IC card. It is only necessary to use a functional unit having a storage function for storing a secret key and a client certificate (or a server certificate) and a processing function for performing at least one of a mutual authentication process and an encryption/decryption process as the IC card 40 according to the embodiment. For example, the IC card 40 may be a SIM card equipped with an IC chip.

In the communication control system 1 of the embodiment, the IC card 40 of the client-side communication control device 30 is attached to the client-side communication control device 30 so that the IC card 40 of the client-side communication control device 30 can be attached to or detached from the client-side communication control device 30. Thereby, in the communication control system 1 of the embodiment, because the IC card 40 and the client-side communication control device 30 can be separated, it is only necessary to replace one device when either one is replaced. For example, when the IC card 40 and the client-side communication control device 30 are integrated, the entire client-side communication control device 30 must be replaced when a part corresponding to the IC card 40 is replaced, but, as compared with this case, in the communication control system 1 according to the embodiment, it is possible to reduce the maintenance cost when a specific part such as the IC card 40 included in the client-side communication control device 30 is replaced.

The communication control system 1 of the embodiment further includes the communication control management device 50, and the communication control management device 50 transmits a secret key and a client certificate to be stored in the IC card 40 attached to the client-side communication control device 30 to the client-side communication control device 30 and transmits a secret key and a server certificate to be stored in the IC card 40 attached to the server-side communication control device 31 to the server-side communication control device 31. Thereby, the communication control system 1 according to the embodiment can perform a handshake using a valid secret key and a certificate issued by the communication control management device 50 and determine a common key and can further improve the security of the social infrastructure system in addition to the above-described effects.

Although the communication control system 1 of the embodiment has been described above, the configuration of the embodiment is not limited to the above example. For example, the communication control device 30 (31) may use a hardware security module (HSM) for implementing the function of the communication control device 30 (31) by hardware on the basis of the processing load.

In the communication control system 1 of the embodiment, secure communication using the SSL/TLS protocol may be performed all the time or whether to perform communication using the SSL/TLS protocol may be selectable. Only the communication in one direction in the two-way communication between the client device 10 and the server device 20 may be set as communication using the SSL/TLS protocol. Secure communication using the SSL/TLS protocol may be performed all the time or whether or not to perform communication using the SSL/TLS protocol may be selectable.

By performing communication using the SSL/TLS protocol all the time, communication from a device different from the valid communication control device 30 (31) authenticated by the communication control device 30 (31) can be blocked. Thus, it is possible to prevent unauthorized access to the client device 10 and the server device 20 and infection of the client device 10 or the server device 20 with malware.

In the communication control system 1 of the embodiment, communication using the SSL/TLS protocol may be performed all the time and unauthorized access to the client device 10 and the server device 20 may be stored. In this case, a record of unauthorized access may be transmitted to the communication control management device 50. The communication control management device 50 can recognize the presence or absence of unauthorized access and can detect a sign stage and take a measure before a large-scale attack on the entire system is started.

In the communication control system 1 of the embodiment, a chip with high tamper resistance called a secure element acquiring CC (common criteria/ISO 15408) authentication may be mounted on the IC card 40 attached to the communication control device 30 (31). By using this chip to store a certificate including a secret key and a public key, very high security can be maintained.

In the communication control system 1 of the embodiment, the program of the client device 10 may be configured to be updated from the server device 20, the communication control management device 50, or the like via the communication control device 30 (31). It is possible to securely update the function of the client device 10 by performing the update of a program (the update of firmware) via the communication control device 30 (31). When the firmware is transmitted from the server device 20 to the client device 10 as described above, for example, a signature of the server device 200 encrypted by the server-side communication control device 31 is assigned to the firmware transmitted from the server device 20. In this case, the client device 10 can determine that the transmitted firmware is definitely the firmware transmitted from the server device 20 by decrypting the signature by means of the client-side communication control device 30. Thereby, even if unauthorized firmware is transmitted from an unauthorized terminal that pretends to be the server device 20 to the client device 10, it is possible to eliminate erroneous update based on illegal firmware with respect to the client device 10.

As described above, by performing communication via the communication control device 30 (31), the firmware can be securely updated from the server device 20, the communication control management device 50, or the like to the client device 10, thus, work cost can be reduced as compared with a case in which a worker physically moves to a place where each client device 10 is installed with respect to a plurality of client devices 10 and performs a firmware update operation.

In the communication control system 1 of the embodiment, the client device 10 may be started or stopped from the server device 20, the communication control management device 50, or the like via the communication control device 30 (31). By performing the start and stop (remote activation) via the communication control device 30 (31), the function of the client device 10 can be updated securely and secure remote control can be implemented.

Although an example in which the client-side communication control device 30-1 communicates with the server-side communication control device 31-1 in the communication control system 1 of the above-described embodiment has been described, the communication destination of the client-side communication control device 30 is not limited thereto. For example, the client-side communication control device 30-1 may communicate with the client-side communication control device 30-2. When a communication start signal has been received from the client-side communication control device 30-2, the client-side communication control device 30-1 first performs mutual authentication in communication with the client-side communication control device 30-2 and checks that the client-side communication control device 30-2 is a valid communication terminal. When the mutual authentication has been correctly performed, the client-side communication control device 30-1 outputs information received from the client-side communication control device 30-2 to the client device 10. By attaching an authentication unit to transmission data using encryption, it becomes possible to detect tampering of communication information and identify a transmitter. Thus, in the communication control system 1 of the present embodiment, a process of "receiving data that has not been tampered" "from a correct communication partner" can be reliably performed in communication between the client-side communication control device 30 and the server-side communication control device 31 and communication between the client-side communication control devices 30.

While several embodiments of the present invention have been described, these embodiments have been presented by way of example and are not intended to limit the scope of the invention. These novel embodiments can be implemented in various other forms, and various omissions, substitutions, and modifications can be made without departing from the spirit of the invention. These embodiments and modifications thereof are included in the scope and spirit of the invention and are included in the invention described in the claims and the equivalent scope thereof.

What is claimed is:
1. A communication control device comprising:
a communication unit configured to wirelessly communicate with a first device and upload information acquired from the first device to a second device via a network; and
a jamming control unit configured to allow jamming radio waves to be output to interfere with wireless communication between the first device and a device other than the communication control device, the device other than the communication control device being configured to perform wireless communication in a communication band used by the first device;

wherein the communication unit is connected to the first device and a network communication network and is configured to communicate with a second communication control device connected to the second device and the network communication network; and wherein the communication control device further comprises:

a first authentication unit; and a first control unit configured to:

request the first authentication unit to perform at least one of a mutual authentication process of performing mutual authentication using a secret key and a client certificate issued by a private certificate authority in communication with the second communication control device and an encryption/decryption process of encrypting information to be transmitted to the second device by the first device using a common key determined by the mutual authentication process and decrypting information transmitted to the first device by the second device;

transmit the encrypted information to the second communication control device; and transmit the decrypted information to the first device;

wherein the communication control device and the first device communicate with each other in plaintext; and wherein the jamming control unit jams radio waves to be output to interfere with wireless communication other than wireless communication performed between the communication control device and the first device and is performed for the communication unit to acquire information transmitted from the first device to the second device.

2. The communication control device according to claim 1, wherein the jamming control unit is configured to allow the jamming radio waves to be output in all frequency bands of an available communication band of the first device at a radio wave intensity with which the communication control device can communicate with the first device.

3. The communication control device according to claim 1, wherein the jamming control unit is configured to allow the jamming radio waves to be output in a band other than a communication band used by the communication control device among available communication bands of the first device.

4. The communication control device according to claim 1, wherein the jamming control unit is configured to allow the jamming radio waves to be output in an available communication band of the first device at timing except for a period during which the first device communicates with the communication control device.

5. The communication control device according to claim 1, wherein the jamming control unit is configured to instruct the first device to set a first communication band used by the first device among available communication bands of the first device as an available communication band of the first device and instruct the communication unit to communicate with the first device in the first communication band.

6. The communication control device according to claim 5, wherein the jamming control unit is configured to instruct the first device to change an available communication band of the first device to a second communication band and instruct the communication unit to communicate with the first device in the second communication band.

7. The communication control device according to claim 1,
wherein the communication unit is configured to receive function information about a communication function of the first device from the first device, and wherein the jamming control unit is configured to determine at least one of a frequency band of the jamming radio waves and an output period of the jamming radio waves on the basis of the function information.

8. A communication control device comprising:

a communication unit configured to wirelessly communicate with a first device and upload information acquired from the first device to a second device via a network; and a jamming control unit configured to interfere with wireless communication between the first device and a device other than the communication control device, the device being configured to perform wireless communication in a communication band used by the first device, according to at least one of an operation of outputting jamming radio waves and an operation of restricting wireless communication between the first device and the device other than the communication control device;

wherein the communication unit is connected to the first device and a network communication network and is configured to communicate with a second communication control device connected to the second device and the network communication network; and wherein the communication control device further comprises:

a first authentication unit; and a first control unit configured to:

request the first authentication unit to perform at least one of a mutual authentication process of performing mutual authentication using a secret key and a client certificate issued by a private certificate authority in communication with the second communication control device and an encryption/decryption process of encrypting information to be transmitted to the second device by the first device using a common key determined by the mutual authentication process and decrypting information transmitted to the first device by the second device;

transmit the encrypted information to the second communication control device; and transmit the decrypted information to the first device;

wherein the communication control device and the first device communicate with each other in plaintext; and wherein the jamming control unit jams radio waves to be output to interfere with wireless communication other than wireless communication performed between the communication control device and the first device and is performed for the communication unit to acquire information transmitted from the first device to the second device.

9. A communication control system comprising:

a first communication control device connected to a first device and a network communication network; and a second communication control device connected to a second device and the network communication network, wherein the first communication control device comprises:

a communication unit configured to wirelessly communicate with a first device and upload information acquired from the first device to the second device via a network;

a jamming control unit configured to allow jamming radio waves to be output to interfere with wireless communication between the first device and a device other than the first communication control device, the device being configured to perform wireless communication in a communication band used by the first device;

a first authentication unit; and a first control unit configured to:

request the first authentication unit to perform at least one of a mutual authentication process of performing mutual authentication using a secret key and a first certificate issued by a private certificate authority in communication with the second communication control device and an encryption/decryption process of encrypting information to be transmitted to the second device by the first device using a common key determined by the mutual authentication process and decrypting information transmitted to the first device by the second device;

transmit the encrypted information to the second communication control device; and transmit the decrypted information to the first device, and wherein the second communication control device comprises:

a second authentication unit; and a second control unit configured to:

request the second authentication unit to perform at least one of a mutual authentication process of performing mutual authentication using a secret key and a second certificate issued by the private certificate authority in communication with the first communication control device and an encryption/decryption process of encrypting information to be transmitted to the first device by the second device using a common key determined by the mutual authentication process and decrypting information transmitted to the second device by the first device;

transmit the encrypted information to the first communication control device; and transmit the decrypted information to the second device;

wherein the first communication control device and the first device communicate with each other in plaintext; and wherein the jamming control unit jams radio waves to be output to interfere with wireless communication other than wireless communication performed between the first communication control device and the first device and is performed for the communication unit to acquire information transmitted from the first device to the second device.

* * * * *